Dec. 15, 1964 L. F. HIGGINS, JR 3,160,981
ANIMATED BIRD HOLDING MOVABLE SNAKE
Original Filed Nov. 6, 1959
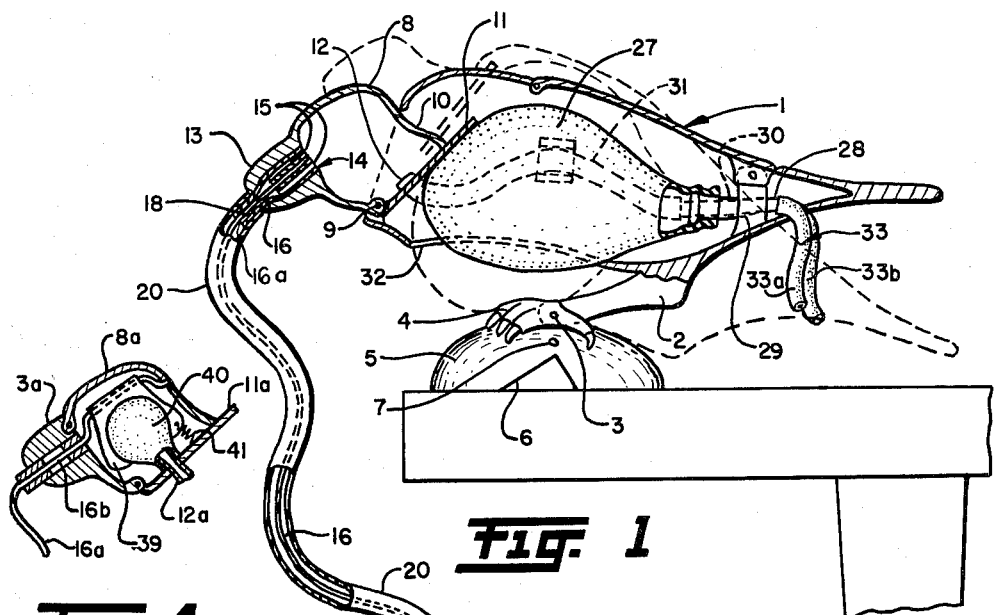
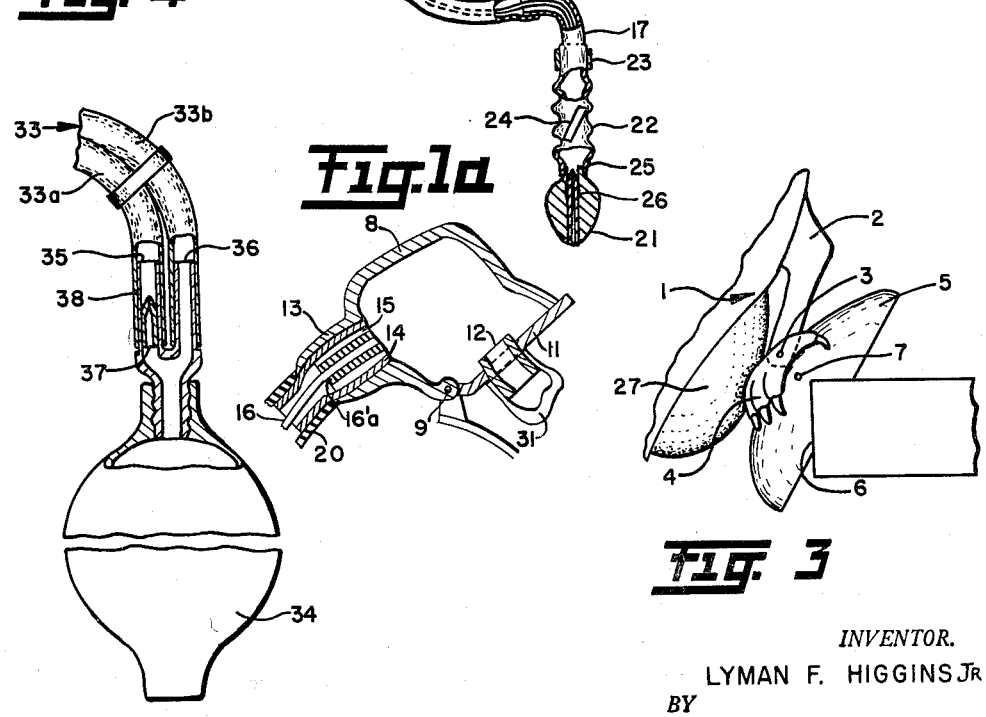
INVENTOR.
LYMAN F. HIGGINS Jr
BY
George W. Wilson.
his ATTORNEY.

United States Patent Office 3,160,981
Patented Dec. 15, 1964

3,160,981
ANIMATED BIRD HOLDING MOVABLE SNAKE
Lyman Franklin Higgins, Jr., Norwich, Conn.
(10424 Evelyn Drive, Clio, Mich.)
Original application Nov. 6, 1959, Ser. No. 851,381, now Patent No. 3,089,279, dated May 14, 1963. Divided and this application Apr. 16, 1962, Ser. No. 187,602
4 Claims. (Cl. 46—124)

My invention relates to the field of animated devices of the type operated by mechanism within the device and activated for instance, though not necessarily by air placed under pressure by a pump, pressure bulb and the like connected to said mechanism.

The invention particularly relates to improvements in devices of the type described in my Patent No. 2,918,752 and has for its general object to provide a greater variety of movements of devices of the type disclosed.

The present application is a divisional of an application by Lyman F. Higgins, Jr., Serial No. 851,381 filed November 6, 1959 now Patent No. 3,089,279 and entitled "Animated Devices."

A wide variety of animated toys, advertising devices and the like have been proposed or are known in the art, most of those capable of a number of different movements being expensive to produce and maintain, while those costing less to produce having a relatively short life.

It is an object of my invention to provide animated devices devised so that they may be made to execute a plurality of movements, which in the case of toys representing animals such as birds, provide amusing, novel, and lifelike effects, the devices being inexpensive to produce and maintain.

The invention is illustrated by way of example in the form of animated representations of birds but it is to be understood is not restricted thereto.

Further objects and features of my invention will appear from the specification following and accompanying illustrative drawings.

In the drawings:

FIGURE 1 is a longitudinal sectional view of an embodiment of the invention the dotted lines indicating the bird in back-tilted position.

FIGURE 1a is an enlarged view of the bird as shown in FIGURE 1.

FIGURE 2 is a detail in section, drawn on a larger scale, showing a pressure bulb adapted to operate the bird shown in FIGURE 1 through a twin hose.

FIGURE 3 is a fragmentary side elevation showing the support for the bird shown in FIGURE 1 mounted on the edge of a table.

FIGURE 4 is a section through a modified head construction of the device shown in FIGURE 1.

An embodiment of my invention is shown in FIGURE 1 in which the body 1 of the bird is supported by legs 2 integral with the body and pivoted at 3 at their lower end to simulated claws 4 integral with a semi-egg shaped member 5 by which the bird is supported on the edge of a table top either by a notch 6 cut in the flat lower surface of member 5, as shown in FIGURE 3, or standing flat on the table at its edge, or supported on a cord or wire passing through transverse hole 7. It will be noted that thet apex of notch 6, holes 7 and pivot 3 of the legs lie in a substantially vertical plane.

The body 1 of the bird is hollow and a head 8 is pivoted on pivot 9 in the shoulder portion. Head 8 is formed with an arcuate rearward extension of the back of the neck 10 enabling the head 8 to pivot without leaving an opening between the neck and shoulder. The head 8 is hollow, the neck 10 being closed by a plate 11 secured to the edge of neck and projecting beyond the back of the neck. The head is limited in outward movement by engagement of the plate 11 with the shoulder portion of the body and in inward movement by engagement of the back of the head with the outer surfaces of the shoulder portion. A short length of tube 12 is cemented to and extends through plate 11 adjacent pivot 9.

The beak 13 of the bird is provided with a load attachment member 14 having peripheral air passage 15 therethrough. One end of a length of stiff wire 16 is secured in the attaching member 14. The wire 16 is bent into curves representing a wriggling snake and curves under the bird. At its free end the wire 16 is fitted into a snake's head supporting member generally indicated at 17, similar in arrangement to member 14.

A short length of rigid tube 18 is inserted in the beak 13 and around the upper end of the wire 16 the attaching member 14 fitting in the tube 18, and wire 16 extending through said tube with a slight clearance 16a. A second short length of rigid tube 19 contains at its lower end part 17. A length of flexible rubber tubing 20 is threaded over the wire 16 before the lower end thereof has been secured and thereafter the ends of the tubing may be pushed onto and secured to the tubes 18 and 19.

The snake's head 21 is connected by a bellows construction as shown at 22 secured to tube 19 as shown at 23. A strip 24 of adhesive tape maye be folded into the corrugations diagonally of the length of the bellows, causing it to extend and retract in a gyratory manner as air under pressure is admitted and released from bellows 22.

The snake's head 21 may be a small metal cast part to the neck 25 of which the lower end of the bellows 22 is secured.

A check valve 26 may be mounted to admit air into the head when pressure air is released therefrom.

The device shown in FIGURE 1 is operated by a balloon 27 mounted within the body of the bird on a nozzle 28 secured in a support 29 extending upwardly from the inner surface of the body toward the tail. A second nozzle or length of tube 30 is secured in support 29 when pressure air is supplied separately to the snake's body and to the balloon as will now be described but is not used if the device is to be operated by a single flow of compressed air.

A flexible tube 31 is connected between nozzle 30 and tube 12 passing through plate 11. This tube 31 may be corrugated at its connection to tube 12 to lessen restraint on the plate 11. An opening 32 is provided in the body of the bird through which the balloon may be caused to protrude and bear against the claws 4.

A twin tube 33 has one tube 33a connected to nozzle 28 and the other tube 33b to nozzle 30. The pressure bulb 34 used with the twin tube 33 is shown in FIGURE 2 and comprises an outlet provided with two nozzles 35 and 36. Nozzle 35 is provided with a check valve 37 and is connected to the tube 33a going to the nozzle 28 on which balloon 27 is mounted while nozzle 36 is not controlled and is connected directly to the tube 33b going to the second nozzle 30. A hole or port 38 through the wall of nozzle 35 and tube 33a enables air to be released from baloon 27 under control of the operator's finger tip.

In the embodiment of the invention shown in FIGURE 1 the bird will initially balance on its support in a downwardly inclined position. As the operator squeezes the bulb 34 and releases pressure repetitiously the balloon will be inflated gradually while the snake struggles continuously.

The bird will finally tilt back until its movement is arrested by any suitable means, such as by engagement of the tail of the bird with the support on which it is mounted. When pressure air is released from the balloon, the bird will rotate forwardly to its initial position. Instead of causing the snake to extend and retract its head I may prefer to cause the snake to be moved from side to side by the bird's head by the means shown in FIGURE 4.

The wire 16a is connected to the crank 16b supported in bearings in the beak 13a and head 8a. A plate 39 is soldered to the crank 16b. A small second balloon 40 is mounted inside the head on nozzle 12a which receives air under pressure each time the pressure bulb 34 is squeezed, the air flowing back into the bulb each time the pressure is released as described previously. The snake will therefore be shaken from side to side by the rocking movement of the wire as the bird is tilted back. In this modification no air enters the rubber tube representing the snake's body and head. A spring 41 may be used to return plate 39 to original position.

If a single stream of air is to be utilized to operate the device, a pressure bulb of the valve form is used, provided however with an opening enabling air to be released from the balloon which opening can be closed by a finger tip of the user until air is to be released.

It will be evident that the wing structure described in my Patent No. 3,089,279 previously referred to may be readily incorporated in the present invention.

It is to be noted that while the devices specifically described are shown as fanciful birds, any number of other forms may be constructed embodying the essential novel features of my invention and, also, while means for operating the devices by air pressurized by a pressure bulb and effecting inflation of one or more balloons or bladders arranged within the devices has been described, other air pressurizing devices may of course be utilized such as pumps, bellows or a source of compressed air, the air operating any suitable means such as bellows.

The embodiments of my invention herein described and shown in the accompanying illustrative drawings have been given by way of example only and not as limitative of my invention since various changes may be made therein by those skilled in the art without departing from the scope thereof as defined by the appended claims.

I claim:
1. An animated device adapted to be placed on a horizontal support, and having a hollow body, parts movably mounted thereon and balloon means within said body operated by air forced thereinto by the user, comprising:
   a head part pivotally mounted on said body;
   a loading and balancing member carried by said head and formed with a flexible hollow body; and
   means for supplying a flow of air under pressure to said balloon and hollow body of the loading and balancing member, and for releasing pressure air from the balloon.

2. An animated device as set forth in claim 1 and in which said means for supplying a flow of air under pressure comprise:
   a pressure bulb and conduit means connecting the outlet of said bulb to the balloon means in the hollow body;
   a one-way valve in said conduit means adjacent said bulb;
   a port in said conduit means between said valve and the balloon adapted to be selectively opened to release air under pressure from said conduit; and
   further conduit means leading air under pressure into the hollow body of the loading and balancing member.

3. An animated device as set forth in claim 2 and in which said conduit means comprise:
   a pair of outlet nozzles extending from the pressure bulb, one of said nozzles being connected to the said balloon and provided with the port, the second of said nozzles being connected through said further conduit means extending from said second nozzle through the hollow body to the head of the device in communication with that hollow body of the loading and balancing member.

4. An animated device adapted to be placed on a horizontal support and having a hollow body and balloon means within said body distendable by air forced thereinto by the user, comprising:
   a hollow head pivotally mounted on the body;
   a loading and balancing member carried by said head;
   a small balloon positioned in said head;
   a wire on which the loading and balancing member is mounted, said wire being rotatably mounted in the head and crank shaped within the head;
   a plate within the head secured to said cranked portion of the wire; and
   conduit means leading air under pressure into and out of said small balloon.

References Cited in the file of this patent
UNITED STATES PATENTS

| 1,859,268 | Larson | May 17, 1932 |
| 2,570,584 | Miskin et al. | Oct. 9, 1951 |
| 2,698,499 | Dygon | Jan. 4, 1955 |

RICHARD C. PINKHAM, *Primary Examiner.*
DELBERT B. LOWE, *Examiner.*